Jan. 30, 1923.
J. M. TOLLES.
CLUTCH.
FILED APR. 2, 1921.
1,443,445.
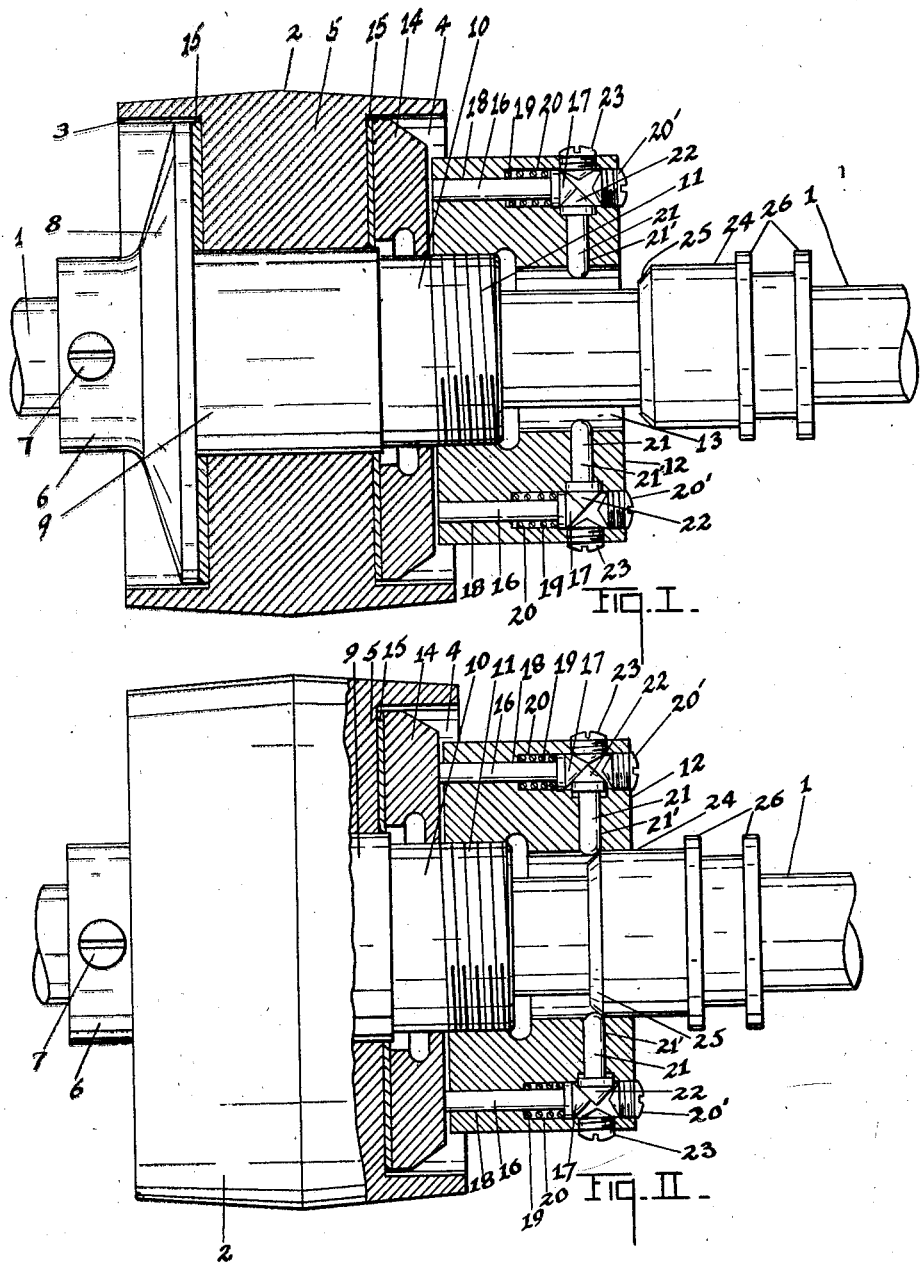
INVENTOR.
JAMES M. TOLLES
BY *Cappell & Earl*
ATTORNEYS.

Patented Jan. 30, 1923.

1,443,445

UNITED STATES PATENT OFFICE.

JAMES M. TOLLES, OF DIAMONDALE, MICHIGAN.

CLUTCH.

Application filed April 2, 1921. Serial No. 458,009.

*To all whom it may concern:*

Be it known that I, JAMES M. TOLLES, a citizen of the United States, residing at Diamondale, county of Eaton, State of Michigan, have invented certain new and useful Improvements in Clutches, of which the following is a specification.

This invention relates to improvements in clutches. It relates more particularly to an improvement in clutches for clutching a loose pulley on a shaft.

The object of the invention is to provide a simple and effective means which does not require the severing of the shaft. Objects relating to details and economies of construction and operation will definitely appear from the detailed description to follow.

I accomplish the objects of my invention by the devices and means described in the following specification. The invention is clearly defined and pointed out in the claims.

A structure containing a preferred embodiment of my invention is fully illustrated in the accompanying drawing, forming a part of this specification, in which:

Fig. I is a detail longitudinal sectional view through a clutch and loose pulley structure embodying the features of my invention, the pulley and portions of the clutch mechanism being shown in section and other portions being indicated in full lines, the clutch being in disengaged position.

Fig. II is a similar view, portions being in section, showing the clutch in operation and being thrown into engagement.

In the drawing similar numerals of reference refer to similar parts throughout the several views.

Considering the numbered parts of the drawing, 1 is the shaft, 2 is a loose pulley, counterbored at 3 and 4 at each end to form suitable projecting flanges and recesses for the clutch engaging member, and forming a central plain web 5, as appears from Fig. I. 6 is the clutch hub or support, which is secured to the shaft by set screw 7. It has an extended flange 8 fitting into the recessed end 3 of the pulley 2. A somewhat enlarged journal 9 is formed at the center for supporting the loose pulley 2, the same being slightly reduced at 10 to receive the clutch member 14, the reduced portion 10 being screw threaded at 11 to receive the cylindrical block 12 which is screw threaded to fit upon the same and form the lateral support for the clutch member 14. The clutch member 14 is supported in the counterbore 4 in the end of the loose pulley 2. Suitable washers 15 which may be of wood fiber are interposed between the flange 8 and the pulley 5 at one end, and the clutch member 14 and the pulley 5 at the opposite end.

Disposed parallel to the axis of the shaft are plungers 16 in suitable bores 18 in said block 12. The plungers 16 have heads 17 conical in form, and are held normally out of engagement by coil springs 19 disposed in counterbored enlargements 20, somewhat after the fashion of window stops. Screw plugs 20' are provided to enable the ready introduction of these plungers.

Radial plungers 21 are disposed in radial bores 21' and are provided with conical heads 22 which contact and coact with the conical heads 17 of the plungers, as clearly appears in the figures. Screw plugs 23 are provided at the outer ends of these radial plungers to permit their ready introduction into the transverse bores.

Supported on the shaft 1 is a clutch actuating member 24, which is sleeved and splined thereon and adapted to reciprocate back and forth within the enlarged bore 13 in the block 12. The actuating end of this clutch plug or member 24 is beveled at 25. The inner ends of the plugs 21 are rounded and project within the periphery of the bore 13 so that they are readily acted upon by the member 24. The member 24 is provided with flanges 26, 26 which form a suitable groove to receive the usual clutch actuating collar or fork, not necessary here to be shown.

From this description I believe the operation of my improved clutch will be very readily understood. The actuating member 24 is forced into the bore 13 and forces the plugs 21 outward which, due to their tapering heads, engage the tapering heads of the plungers 16 and force the same outwardly into engagement with the clutch member 14, as seen in Fig. II. The clutch member 14 rests loosely upon the shaft until it is clamped by the plunger 16. The structure is adjusted for wear and also to secure the best results by adjusting the block 12 on the screw thread 11.

I have described my improved clutch in its preferred form, but desire to state that I am aware it can be very considerably modified without departing from my invention. The clutch actuating device is of special consequence and different kinds and styles of clutch members might be employed, although the simple disc and flanges that I have shown are entirely sufficient for the purpose.

Having thus described my invention what I claim as new and desire to secure by Letters Patent is:

1. In a clutch the combination of a hub member with a suitable flange, a loose pulley thereon with a flat face corresponding to the said flange and an outer flat face, a clutch disc disposed on the outer face and adapted to act thereon, a block screwed upon the said hub with an enlarged central longitudinal bore, spring plungers for the actuation of said disc, said plungers having conical heads and being disposed in bores parallel to the shaft, radially disposed plungers with conical heads disposed so that their conical heads will act upon the conical heads of the spring plungers and their inner ends will project within the central bore, an actuating member with a tapered end disposed to enter said central bore for forcing the said radial plungers outwardly to carry the spring plungers against the clutch disk, coacting for the purpose specified.

2. A clutch actuating member comprising a block adapted to be secured to a shaft having an enlarged central axial bore and smaller parallel bores, clutch actuating plungers disposed in the said smaller parallel bores with conical heads, radial bores and radial plungers with conical heads disposed in said bores to coact with the said clutch actuating plungers, and a tapered member to force the said radial plungers outward, all coacting as specified.

In witness whereof, I have hereunto set my hand and seal in the presence of two witnesses.

JAMES M. TOLLES. [L. S.]

Witnesses:
JAY W. RIDER,
LEO SABIN.